United States Patent
Virtanen et al.

(10) Patent No.: US 6,879,828 B2
(45) Date of Patent: Apr. 12, 2005

(54) UNBROKEN PRIMARY CONNECTION SWITCHING BETWEEN COMMUNICATIONS SERVICES

(75) Inventors: Keijo Virtanen, Tampere (FI); Tarja-Leena Ranta, Lohja (FI)

(73) Assignee: Nokia Corporation, Espoo (FI)

( * ) Notice: Subject to any disclaimer, the term of this patent is extended or adjusted under 35 U.S.C. 154(b) by 290 days.

(21) Appl. No.: 10/237,126

(22) Filed: Sep. 9, 2002

(65) Prior Publication Data

US 2004/0048612 A1 Mar. 11, 2004

(51) Int. Cl.$^7$ .................................................. H04Q 7/20
(52) U.S. Cl. ..................... 455/426.1; 455/434; 455/462
(58) Field of Search ............................. 455/426.1, 434, 455/462

(56) References Cited

U.S. PATENT DOCUMENTS

| | | |
|---|---|---|
| 5,058,151 A | 10/1991 | Tanaka et al. |
| 5,778,316 A | 7/1998 | Persson et al. |
| 2004/0042541 A1 | 3/2004 | Matsumura |

FOREIGN PATENT DOCUMENTS

| | | | |
|---|---|---|---|
| WO | 0105108 | 1/2001 | ........... H04L/12/66 |

*Primary Examiner*—William D. Cumming
(74) *Attorney, Agent, or Firm*—Antonelli, Terry, Stout & Kraus, LLP

(57) ABSTRACT

A method allows a user of a mobile terminal to switch from a communication service currently active between that mobile terminal and another mobile terminal to a different communication service in such a manner that the end to end connection between terminals appears unbroken to the user. The user initiates the switch by inputting an appropriate command at the mobile terminal. The mobile terminal then transfers a request to the other mobile terminal. The request invokes a user interface on the other mobile terminal and prompts the user of the other mobile terminal to indicate whether or not they agree to switch from the currently active communication service to the other communication service. After receiving the user's response to the prompt, the other mobile terminal sends back a reply indicating the user's response. Signaling to perform the switch is initiated in response to the reply. The active communication service is terminated at the first and second mobile terminal at substantially the same time that the second communication service is initiated at the first and second mobile terminal.

15 Claims, 17 Drawing Sheets

UNBROKEN PRIMARY CONNECTION SWITCHING BETWEEN COMMUNICATIONS SERVICES

BACKGROUND

1. Field of the Invention

The present invention relates generally to the field of wireless communications. In particular, the invention relates to the user interaction with a mobile terminal when switching between communication services.

2. Discussion of the Related Art

In the development of wireless communications, there is a trend towards supporting various communication services in addition to a conventional voice call. Some communications services, such as short message service (SMS), multimedia message service (MMS), e-mail, network operator messages, push services, etc., are not continuous services and can be provided in secondary connections which are simultaneous with the primary connection and which do not require disconnection of the primary connection. Depending on the particular air interface, multiple simultaneous connections may be possible to/from a wireless communication terminal. For example, GSM wireless communication networks can provide a primary circuit switched (CS) connection for a voice/data call and a simultaneous secondary connection which can send and receive SMS messages during the call to a mobile terminal with a headset.

Some communications services, such as voice, instant messaging (such as chat), and video messaging, can only be provided through primary connections because the user interaction in the service is expected to be substantially continuous without any lengthy interruption. GSM and other conventional wireless communication networks can only provide one primary connection at a time to a mobile terminal. Thus, the primary connection for one communication service must be ended before the primary connection for another communication service is initiated. Furthermore, a communication service, such as a chat session, may be automatically terminated by an incoming phone call and cannot be resumed after the incoming phone call has ended.

A Wideband Code Division Multiplex Access (WCDMA) air interface has been proposed in the 3rd Generation Partnership Project which can provide several simultaneous primary connections to a single wireless communication terminal. However, even though multiple primary connections may be available over a WCDMA air interface, the user experience at the terminal when switching between primary connections may not be fluent or otherwise satisfactory, especially when a user wishes to continue communicating with the same person but through a different type of communication service. A person may desire to switch from a voice service to a chat service because they no longer wish to speak out loud. A person may desire to switch from a voice service to a video service so that they can see something, such a person's face, or to switch from a video service to a voice service so that something will not be seen.

Even if multiple primary connections are available in a wireless communication network, the user interaction necessary to switch between communication services consists of performing two separate methods, the first method consisting of those steps necessary to terminate the first communication service and the second method consisting of those steps necessary to activate the second communication service. Although the network allows different types of communication services, there is still a disadvantage that the user interaction is cumbersome at least because different methods and several steps are necessary to switch between the communication services. The lack of immediacy in switching is a concern because the user may believe that he has lost contact with the other person if there is a long period of time without contact while the switching occurs.

There are now numerous communication services which carry various forms and combinations of multimedia content such as video, web content, graphics and text. As used in this application, the term "multimedia" refers to any content having a visual element. The mobile terminals of wireless communication networks, particularly phones of cellular networks, are now capable of transporting data, including multimedia data in various communication services. Many types of mobile terminals are being used, such as cellular phones, cordless telephones, personal digital assistants (PDAs), palm-held computers and laptop computers. The strong push in current wireless technology development is to use mobile terminals for varied applications and to allow users of such devices to seamlessly integrate events and needs in their lives while maintaining adequate communications power to receive and transmit all of the data and information which has an impact on them.

An advanced mobile terminal supported by so-called third generation (3G) and fourth generation (4G) networks and using the latest innovations in computers, software, displays and other technologies may access and receive a variety of many different communication services. Unfortunately, the manner and duration (apparent to the user) of the procedure necessary for switching among the communication services may vary widely and unpredictably. These communication services may be provided by different information sources in other networks and may be based on and built upon a variety of data transfer techniques. This introduces more delay and uncertainty into mobile terminal switching among different communication services.

For at least these reasons, present methods of switching between different communication services at a mobile terminal have disadvantages. Accordingly, there is a need for effective solutions that allow for easy and substantially immediate mobile terminal switching between different communication services without it appearing to the user that the connection is broken at any time.

BRIEF SUMMARY OF THE PREFERRED EMBODIMENTS

To overcome limitations in the prior art described above, and to overcome other limitations that will be apparent upon reading and understanding the present specification, it is therefore an object of the following described preferred and exemplary embodiments to overcome the above mentioned disadvantages. In particular, an object of the preferred and exemplary embodiments is to provide a solution which facilitates mobile terminal switching among various communication services which appears, to the users of the mobile terminals, to be substantially immediate and the end-to-end connection unbroken.

In the preferred and exemplary embodiments, a method allows a user of a mobile terminal to switch from a communication service currently active between the mobile terminal and another mobile terminal to a different communication service in such a manner that the end to end connection between appears unbroken to the user. The user initiates the switch by inputting an appropriate command at the mobile terminal. The mobile terminal then transfers a request to the other mobile terminal. The request invokes a user interface on the other mobile terminal and prompts the user of the other mobile terminal to indicate whether or not they agree to switch from the currently active communication service to the other communication service. After receiving the user's response to the prompt, the other mobile terminal sends back a reply indicating the user's response. Signaling to perform the switch is initiated in response to the reply. The active communication service is terminated at the first and second mobile terminal at substantially the same time that the second communication service is initiated at the first and second mobile terminal.

A particular aspect of the preferred and exemplary embodiments involves a software application on the mobile terminal which carries out a method of switching between communication services in which the new communication service is substantially immediately presented to the users on the mobile terminals when the previous communication service is terminated without particular requests needing to be made by the user. Preferably, the user can make a simple selection on a displayed user interface to switch from a currently active communication service to one of a number of available communication services.

This and other features of the preferred and exemplary embodiments of the invention will become apparent and better understood from the following detailed description when considered in conjunction with the accompanying drawings. It is to be understood, however, that the detailed description and drawings are designed solely for the purposes of illustration and not as a definition of the limits of the invention, for which reference should be made to the appended claims.

BRIEF DESCRIPTION OF THE DRAWINGS

In the drawings, wherein like reference numerals identify similar elements throughout the several views.

DETAILED DESCRIPTION OF THE PREFERRED EMBODIMENTS

In the following description of the various preferred embodiments, reference is made to the accompanying drawings which form a part hereof, and in which is shown by way of illustration various preferred embodiments in which the invention may be practiced. It is to be understood that other embodiments may be utilized and structural and functional modifications may be made without departing from the scope of the present invention.

Figure 1:
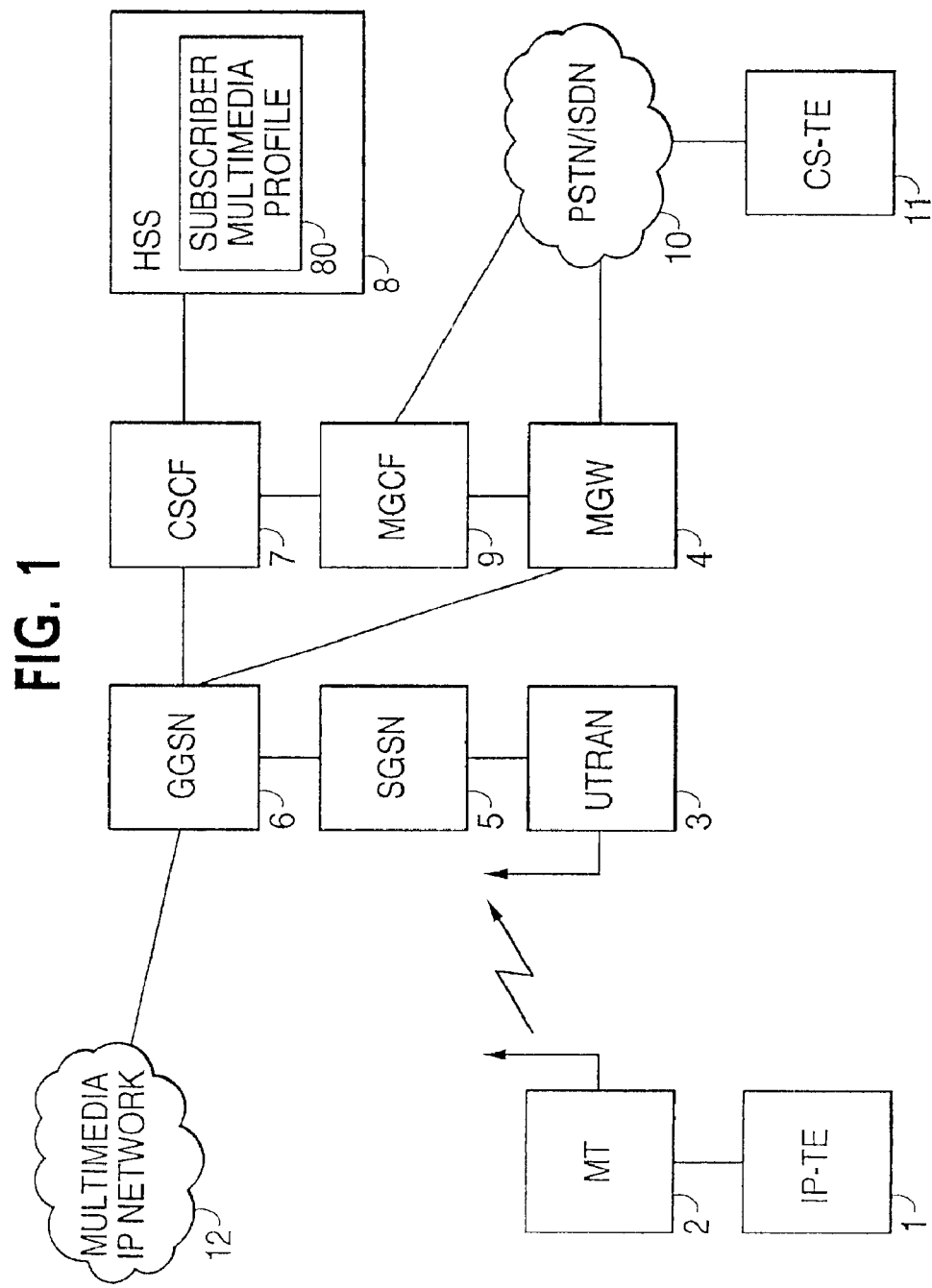
FIG. 1 is a block diagram of a network environment according to a 3GPP all IP reference model in which the preferred embodiments of the invention may be practiced.

Attention now is directed to FIG. 1, which shows a block diagram of a preferred and exemplary wireless communication network according to a 3GPP all IP reference model and in which a method of switching between communication services at mobile terminals may be carried out according to a preferred embodiment of the present invention. It will be appreciated that the present invention is applicable to a variety of different types of communications services, but is most advantageously applied to multimedia communication services requiring a primary connection on a wireless communication network.

According to FIG. 1, an Internet Protocol (IP) terminal device or terminal equipment 1 is connected to a third generation (3G) mobile terminal 2 which provides a bi-directional radio connection to an Universal Terrestrial Radio Access Network (UTRAN) 3 of the Universal Mobile Terrestrial Service, (UMTS) System. The mobile terminal is preferably capable of receiving any one or more of various communication services and providing corresponding received data to the user. The UTRAN 3 comprises at least one Radio Network Controller (RNC, not shown) for providing a switching function to e.g. a General Packet Radio Service (GPRS) network comprising a Serving GPRS Support Node (SGSN) 5 having a switching and mobility mangement function in the GPRS core network of the Universal Mobile Terrestrial Service (UMTS) system. Furthermore, the SGSN 5 is connected to a Gateway GPRS Support Node (GGSN) 6 which provides an access function to a multimedia IP-based network 12, such as the Internet.

Additionally, the RNC of the UTRAN 3 may establish a connection to a circuit switched (CS) terminal equipment 11 via a fixed network or PSTN/ISDN network 10 and a Media Gateway (MGW) 4 arranged for adapting the PS multimedia connection of the UMTS network (including the SGSN 5 and the GGSN 6) to the CS connection of the PSTN/ISDN 10. Similarly, the packet switched (PS) multimedia connection can be adapted to a CS connection of a CS mobile network such as the UMTS release 1999 CS domain or a GSM network. In particular, the MGW 4 may allow a PS H.323 or a Session Initiation Protocol, (SIP) system defined by 3GPP for use in the IP multimedia (IM) Core Network (CN) to interoperate with PSTN/ISDN terminals such as the CS terminal equipment 22 which may be a H.324 (H.324/I) compliant terminal. The gateway functionality of the MGW 4 is addressed e.g. in the ITU-T recommendation H.246 for the case of an interworking of H-series multimedia terminals with H-series multimedia terminals and voice/voice-band terminals on PSTN and ISDN.

The MGW 4 is connected to a Media Gateway Control Function (MGCF) 9 which is connected via a Transmission Signaling Gateway (T-SGW, not shown) to the PSTN/ISDN 10. The MGCF 9 may be connected via a Call State Control Function (CSCF) 7 to a Home Subscriber Server (HSS) 8 comprising a subscriber multimedia profile database 80.

The preferred embodiments of the invention are concerned with improving the switching between a variety of communication services. For example, users on a call may want to make silent comments in a chat session or drawings that are forwarded for display on the mobile terminal 2 of the other user. To accomplish this, a software application/user interface is preferably stored in mobile terminal 2. Having the application resident on the mobile terminal 2 increases the speed of switching between the communication services, and allows the user interface to be well designed with suitable graphical elements for the characteristics of mobile terminal 2.

Figure 2:
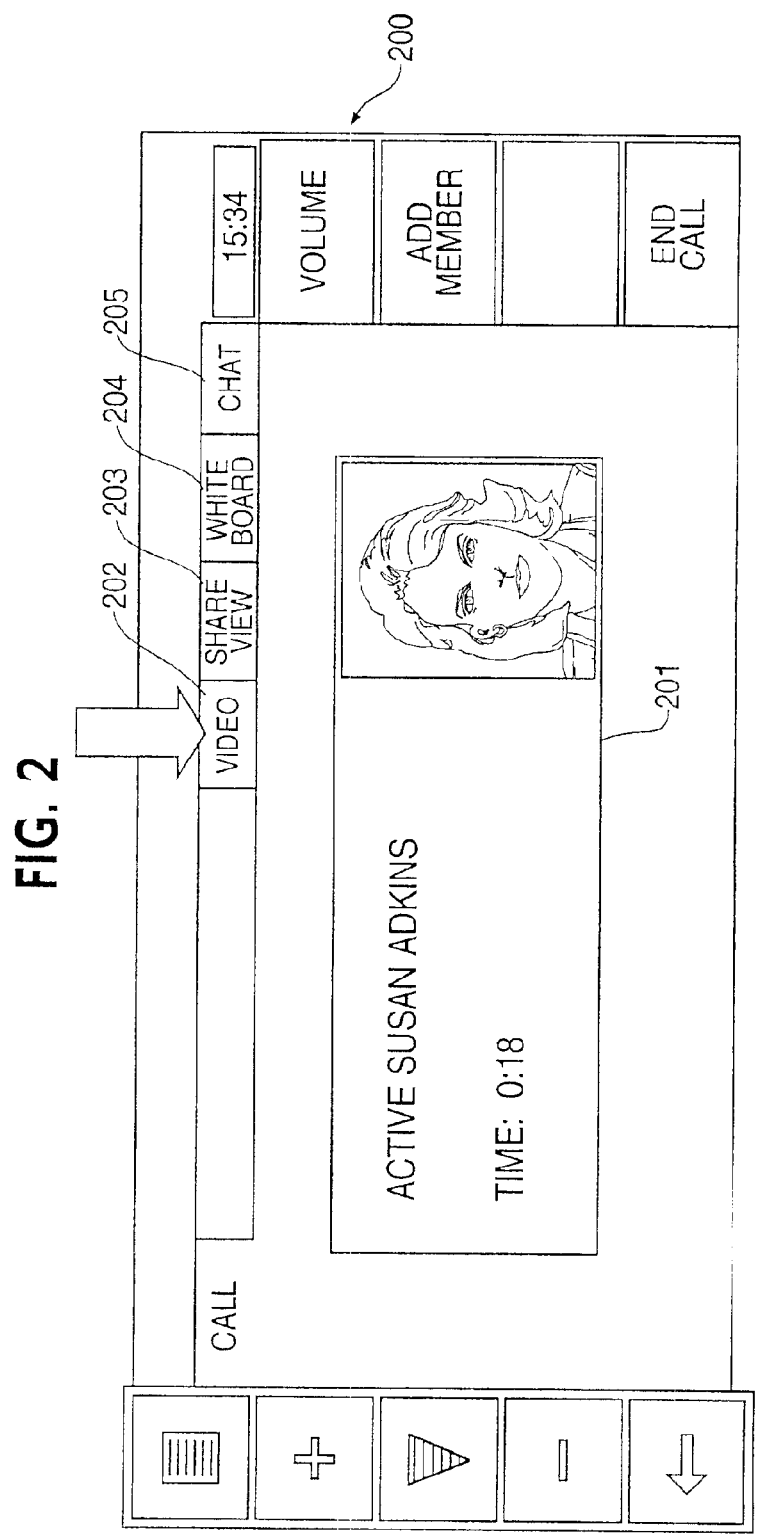
FIG. 2 is an illustration of a possible user interface which may be deployed on the display of a mobile terminal during a voice call.

FIG. 2 illustrates an exemplary display 200 of a mobile terminal 2 of a user (Eric Williams) having an active voice call to another person (Susan Adkins). The display 200 preferably includes a window 201 relating to the voice call. The window may contain, for example, the name of the other person, a preexisting picture of the other person (the picture is not a live picture), and an indication of the current duration of the call. The displayed text may be "Active Susan Adkins" as shown in FIG. 1, or "Audio call to Susan Atkins" or something similar. As will be explained more below, display 200 preferably includes tabs 202–205 corresponding to other available communication services (for example, a video call, a chat session, a whiteboard application and a shared view application as shown in FIG. 2). The other tabs 202–205 have closed connections and only the voice call tab with window 201 has an active connection. Alternatively, there may be a drop-down menu or some other method provided to allow easy selection and requesting of other available communication services. The variety of available communication services may vary greatly from one network environment to another. For example, a 2.5 G network may have only a chat service and whiteboard application service while a 3G network may also have a video call service and a shared view application service.

Figure 3:
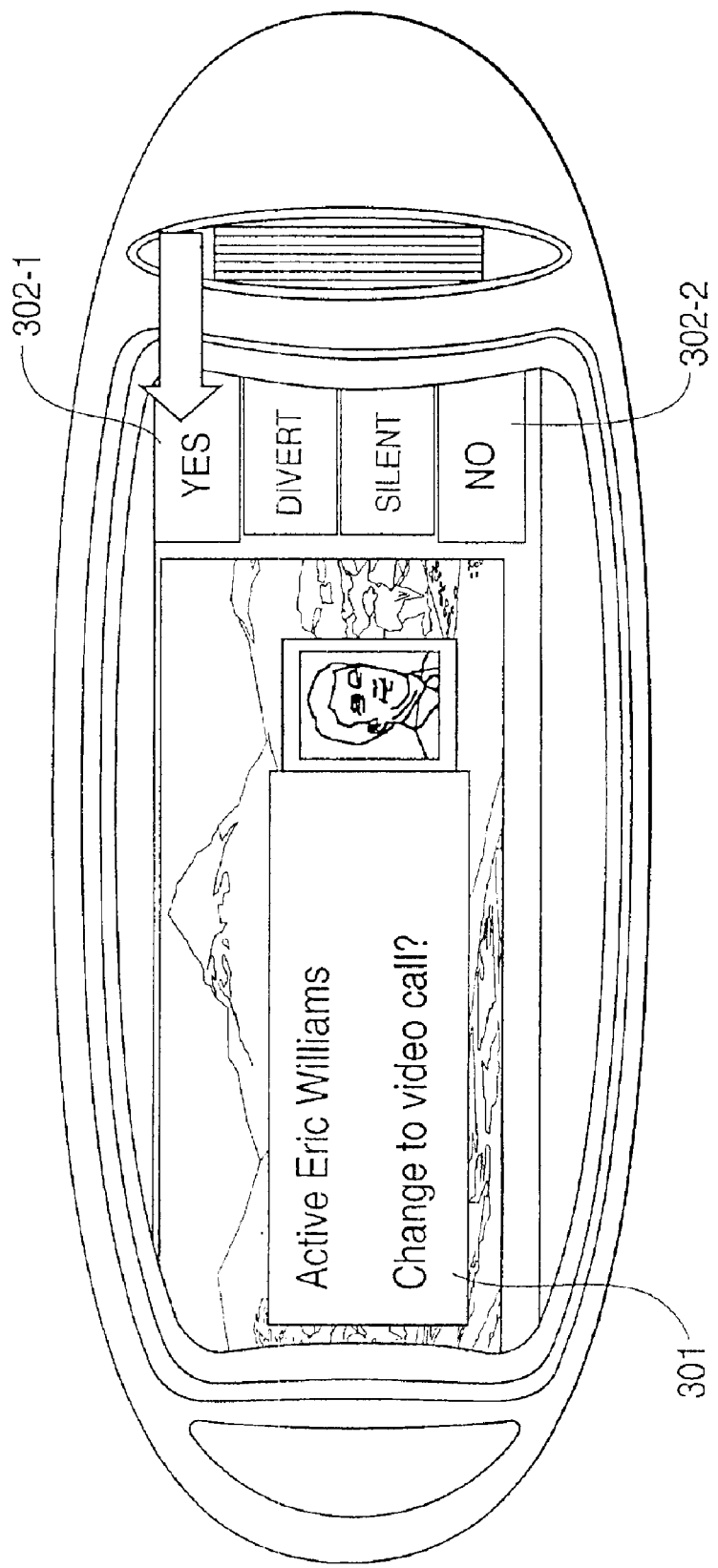
FIG. 3 is an illustration of a possible user interface which may be deployed on the display of a mobile phone in response to a request from another mobile terminal to switch from a voice call to a video call according to an embodiment of the present invention.
Figure 4:
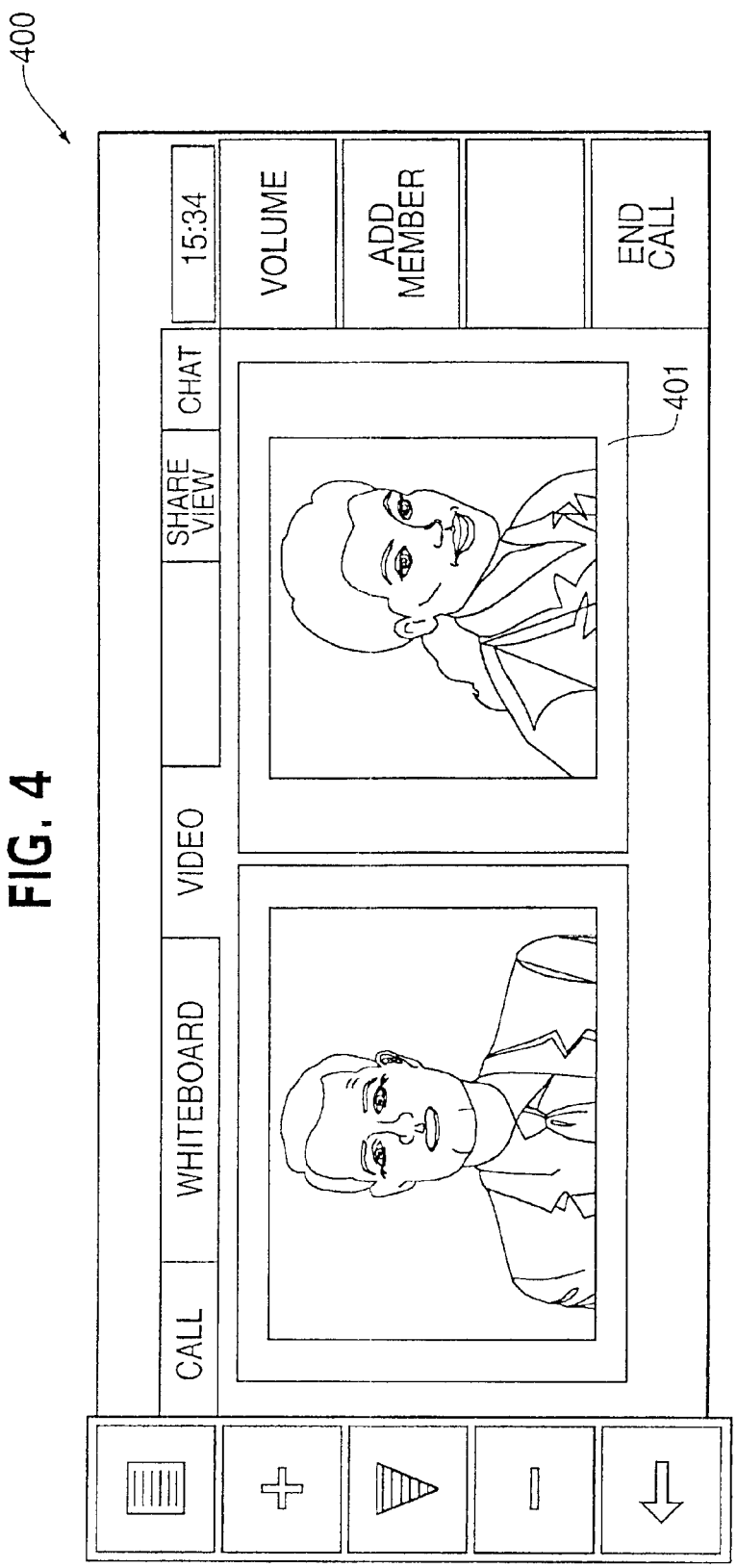
FIG. 4 is an illustration of a possible user interface which may be deployed on the display of the mobile terminal after the voice call has been switched to a video call.

A example of the user interfaces on the mobile terminals in a preferred embodiment of the method of switching between communications services is shown in FIGS. 3 and 4. In the example, Eric having a voice call communication service with Susan wants to switch to a video call communication service with Susan. Eric enters a command on his mobile terminal 2 to send a request to Susan's terminal indicating his desire to switch from a voice call to a video call. In the example of a mobile terminal having a software application/user interface to provide display 200 as shown In FIG. 2, Eric makes the request by simply selecting the tab corresponding to the desired service.

Various information may be contained in the request message transmitted by the mobile terminal 2, such as details of the mobile terminal related to carrying out the suggested service (video format type, etc). The request may be logged in the receiving mobile terminal. It is a design choice when to remove request entries; for example a request can be removed when that session is completed, plus some predetermined time.

FIG. 3 illustrates a simple example of a display 300 at Susan's terminal upon receipt of the request to switch to another communication service. The display 300 includes a window 301 which may contain, for example, the name and a preexisting picture of Eric. The window 301 preferably automatically includes a prompt such as "Change to video call" without the user of the receiving terminal having to take any action. Also, although the user interface is shown in FIG. 3 as being rather simple, the user interface may take a variety of forms and be in any number and combination of multimedia formats (video, audio, graphics, animation, etc.). The content may, for example, announce the identity or source of the other party or service provider with video programming, either with text, audio, video or graphics. There are several general methods in which either Eric or Susan, by accessing the multimedia subscriber profile 80 for Susan's terminal, is able to exert some control over the user interface and prompt on Susan's terminal, including window 301. The prompt typically includes at least a display shown to the user on the display of the mobile terminal, but it may also consist of tactile notification, such as vibration of the mobile terminal, or a distinctive ringing tone.

It is particularly preferable that the user interface, including prompt, be available on Susan's terminal substantially immediately after the request is made at Eric's terminal. Susan can then respond to the prompt by simply pressing YES button 302-1 or NO button 302-2 or taking any other action appropriate for the user interface utilized on her terminal for the request to indicate whether or not she agrees to switch the communication service.

FIG. 4 shows an example of the resulting display 400 on Eric's mobile terminal immediately after the switch from the voice call communication service to the video call communication service has been completed. Unlike the preexisting pictures of the users in FIGS. 2 and 3, the pictures in FIG. 4 are "live" pictures according to the specification of the video call communication service. There may also be other information displayed or otherwise provided during the video call, such as, for example, the duration of the video call and/or the cumulative duration of the video call and the previous voice call. As explained below, at any time, the users may again switch to another communication service in the same manner as described above with respect to FIGS. 2–4.

The method of switching communication service may utilize software application in a network element (e.g., MGCF a) to adapt the existing resources by releasing part of the used connection resources. Alternatively, the MGCF may reserve new resources and release earlier reserved resources. Another alternative is that the MGCF a reserves an additional portion of the required network connection resources in respect to an earlier used network connection in such a way that newly reserved and earlier provisional network connection resources are used together to satisfy the connection resource needs to support the newly switched service requirements.

The software application carrying out the above method of switching communication services may itself be able to perform one or more of the communication services or there may be one or more other software applications on mobile terminal 2 to perform one or more of the communication services. For example, there may be one software application to perform the video call service, another software application to perform the chat session, etc. Alternatively, a software application may perform more than one communication service. In any event, such software applications may interact with the software application carrying out the above method of switching communication services through application programming interfaces (APIs) or similar methods. Alternatively, each of such software applications may be revised or developed to include user interface commands for each one of the communication service change request. The mobile terminal 2 may have any one of a variety of different software application managers for managing the software applications resident on the mobile terminal 2 or downloaded to the mobile terminal 2. Such a software manager may be terminal and implementation dependent.

Once stored in the mobile terminal 2, the software application for carrying out the method of switching communications services can be launched at any time as long as a primary connection is active. The launch can be user activated or activated automatically whenever a primary connection is opened. However, it is preferred that some elements of user interface do not have to always be present. For example, as shown in FIGS. 2 and 4, a clock or timer in the upper right of the display, the function buttons on the left side (for printing, navigation, etc.) and the right side of the display (volume control, adding member, ending call, etc.) may be constant. The various windows 201, 301, and 401 are present and absent according to the state of communications. Furthermore, the tabs 202–205, the Yes button 302-1, the NO button 302-2, and the function buttons for diverting a call are also present according to the state of communications. As indicated in FIG. 3, there may be a background, either fixed or at the user's preference, on the display when the elements are not present.

It is preferred that once the software application performing the method for switching communication services is launched, it remains in the background until the method is invoked, for example, a change in communication service is requested. Preferably, neither user has to provide complicated inputs. It is a particular feature of the preferred embodiments that the software application utilizes previously obtained information and requires only one single action by the appropriate user at the various steps in the method. This can be done as shown in FIGS. 2–4, for example, by providing a plurality of tabs 202–205 each corresponding to an available communication service which may be requested and YES and NO buttons 302-1 and 302-2 for the reply to the request. In order to switch to a particular service according to a preferred embodiment of the invention, the user merely selects one of the tabs 202–205, and in order to reply, the user selects one of the YES and NO buttons 302-1 and 302-2. However, the implementation of FIGS. 2–4 is merely exemplary and others may be used instead.

Figure 5:
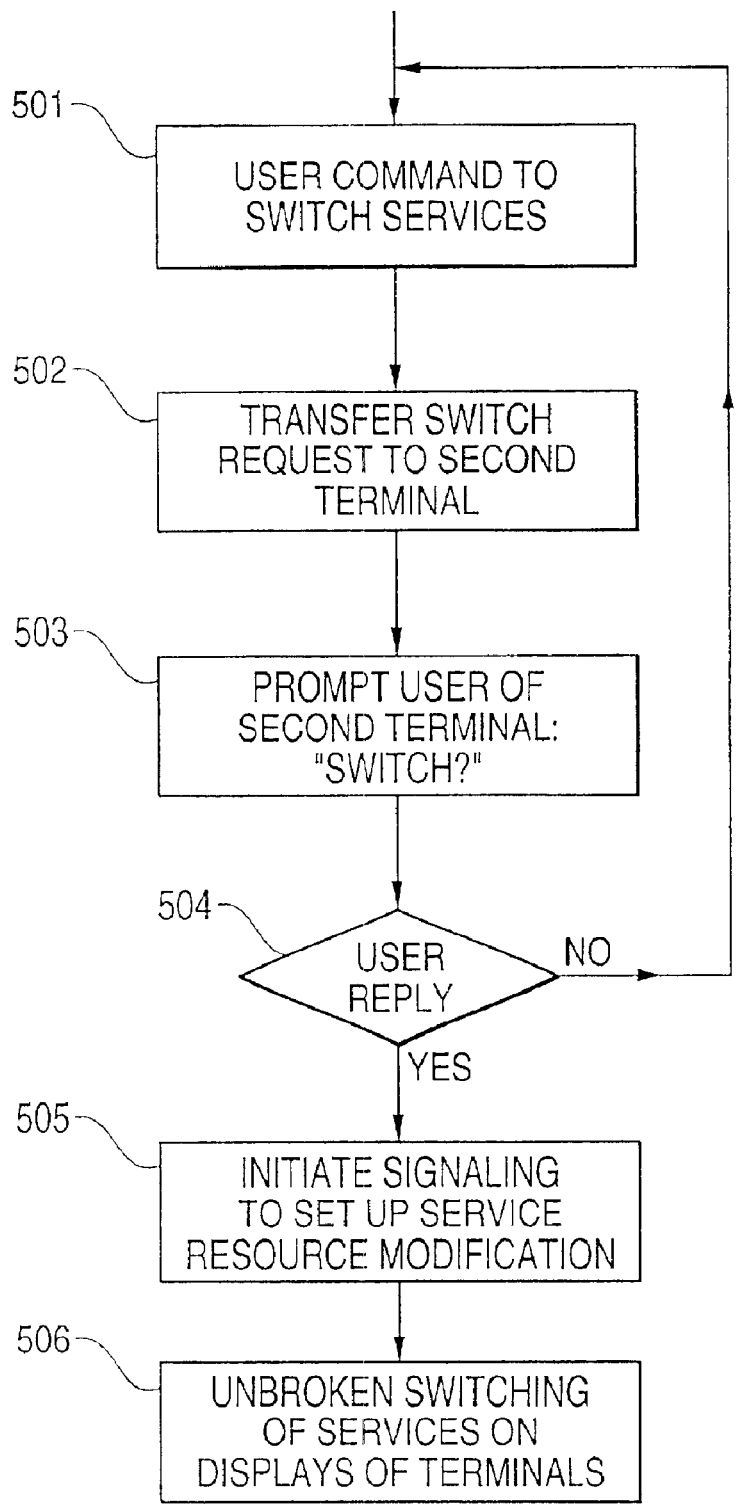
FIG. 5 is a flowchart illustrating a method of switching the communication services between mobile terminals according to a preferred embodiment of the invention.

FIG. 5 is a flowchart illustrating the general method of the preferred embodiments without specific reference to the implementation in FIGS. 2–4. The first step in the method is the receipt of a user command at a first terminal to switch communication services (step 501). The second step is the transfer of the request to switch communication services from the first terminal to the second terminal (step 502). When the request is received at the second terminal, a prompt is provided to the user of the second terminal to obtain an indication from the user indicating whether or not the user agrees to switch communication services (step 503). If the user reply is NO (step 504), then the method reverts back to the initial state. If the user reply is YES (step 504), then the signaling is initiated to set up the change in communication services (step 505). The preferred embodiments for the signaling are addressed further below, but the signaling in step 505 is such that it enables the communication resources of the services to be modified in such a manner that the service switching appears to be substantially immediate on the displays of the mobile terminals (step 506).

Of course, FIG. 5 is a simple flowchart illustrating a single change of communication services according to a preferred embodiment of the invention. However, the communication service may be changed several times during a single end to end mobile terminal session. FIGS. 6–13 illustrate an example of a session in which the communication service is changed several times. service or vise versa between two mobile terminals in the communication network system.

Figure 6:
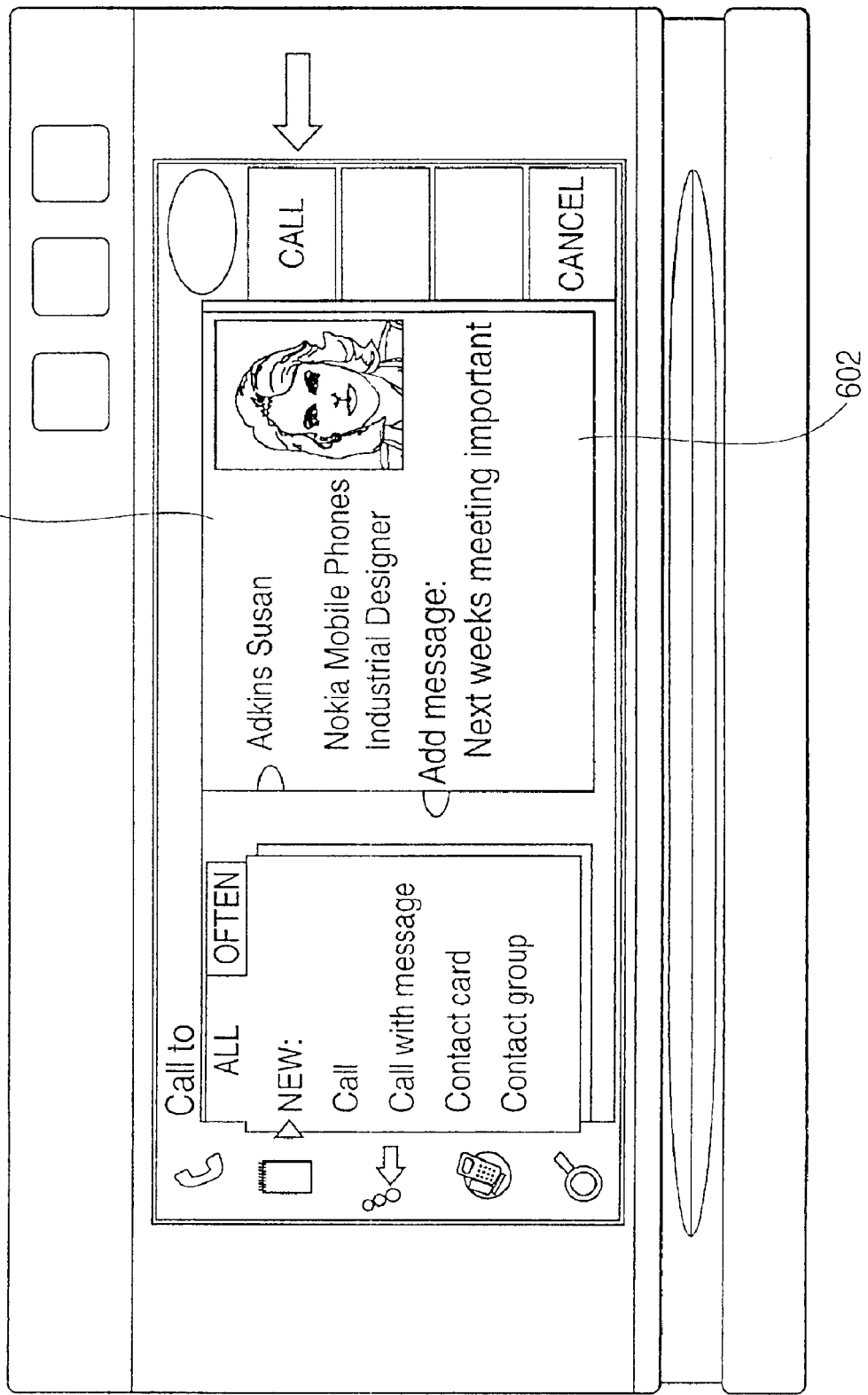
FIG. 6 is an illustration of the composition by a user of a request for a communication service at a first mobile terminal making the request according to a preferred embodiment of the invention.

FIG. 6 illustrates the composition of an original multimedia call at Eric's mobile terminal 2. As indicated, the mobile terminal 2 includes a menu 610 that supports a variety of options for implementing calls. The options include the option to make a call accompanied by a message. Once this option is selected, a composition screen 601 appears which includes a message area 602 for adding a message to accompany the text. The message may be a simple text: "Next weeks meeting. Important!".or it may be a selected picture or other content. Preferably, the content has a size small enough to allow it to be included in the payload of a Session Initiation Protocol (SIP) signaling message as an IP multimedia message supported in the core network. Once the message is composed, the request can be sent by selecting the call button 603.

Figure 7:
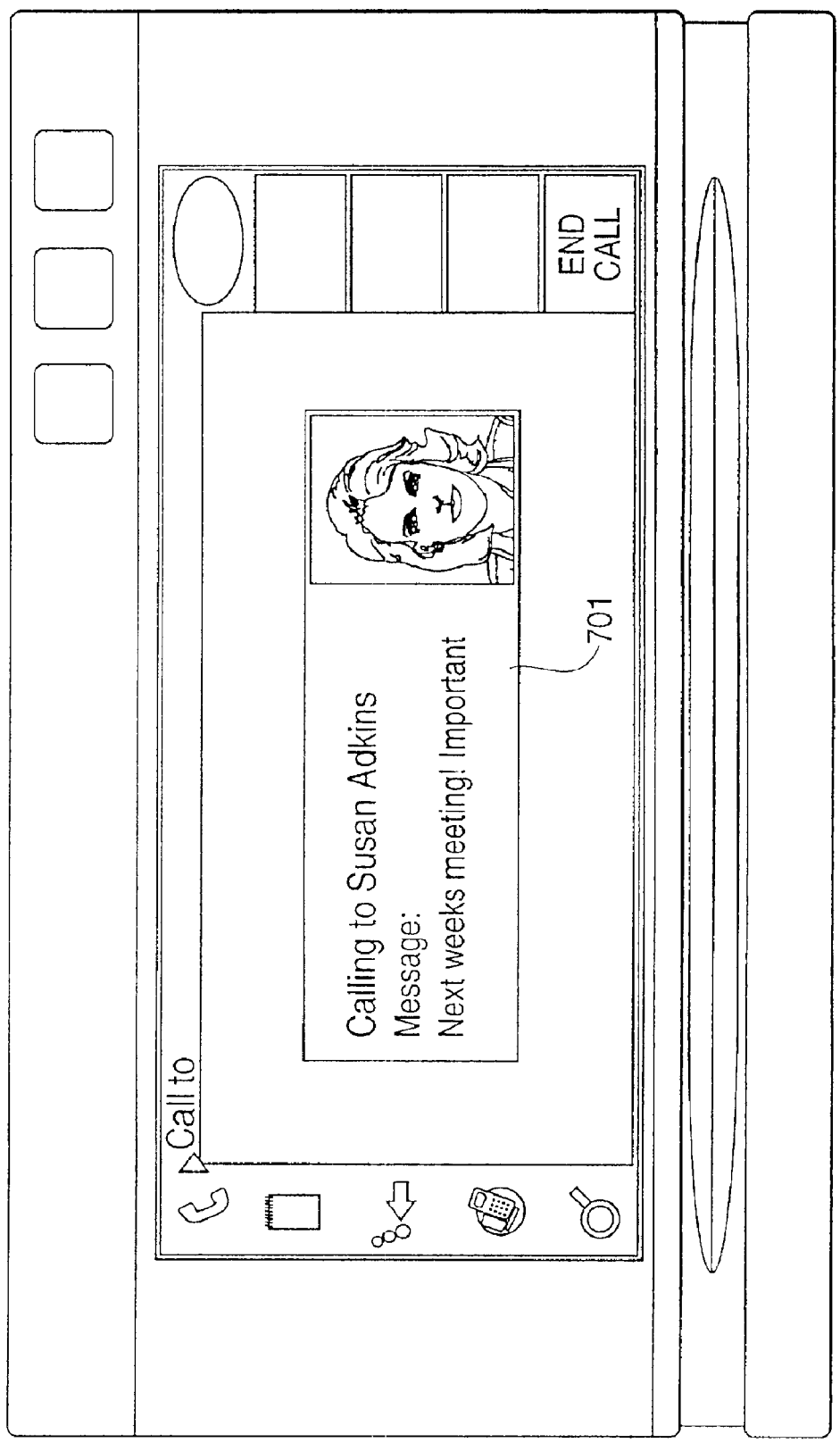
FIG. 7 is an illustration of the request composed in FIG. 6 as it appears on the display of the first mobile terminal.
Figure 8:
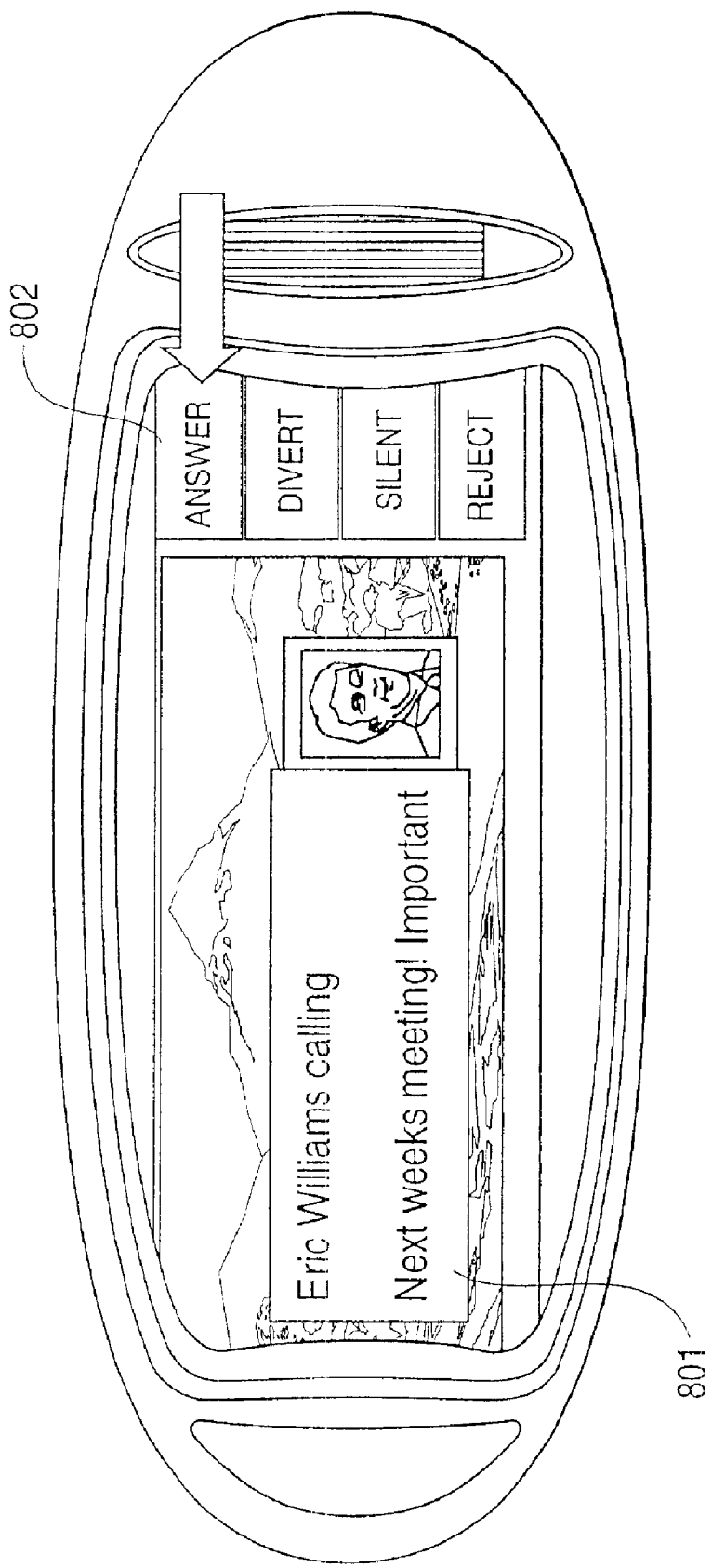
FIG. 8 is an illustration of the request composed in FIG. 6 as it appears on the display of a second mobile terminal receiving the request.

FIG. 7 shows the display, including the composed message, in window 701 at Eric's mobile terminal at the time that the call is made. FIG. 8 shows the display of Susan's terminal upon receipt of the request. The display includes the call request, including the individually composed message as well as pre-determined picture and name, in window 801 and answer button 802 for answering the call (other buttons available for diverting the call, silencing the call, or rejecting the call also available). After Susan's selection of answer button 802, the display of Eric's terminal may be as set forth in FIG. 9, including window 901, and the display of Susan's terminal may be as set forth in FIG. 10, including window 1001.

Figure 9:
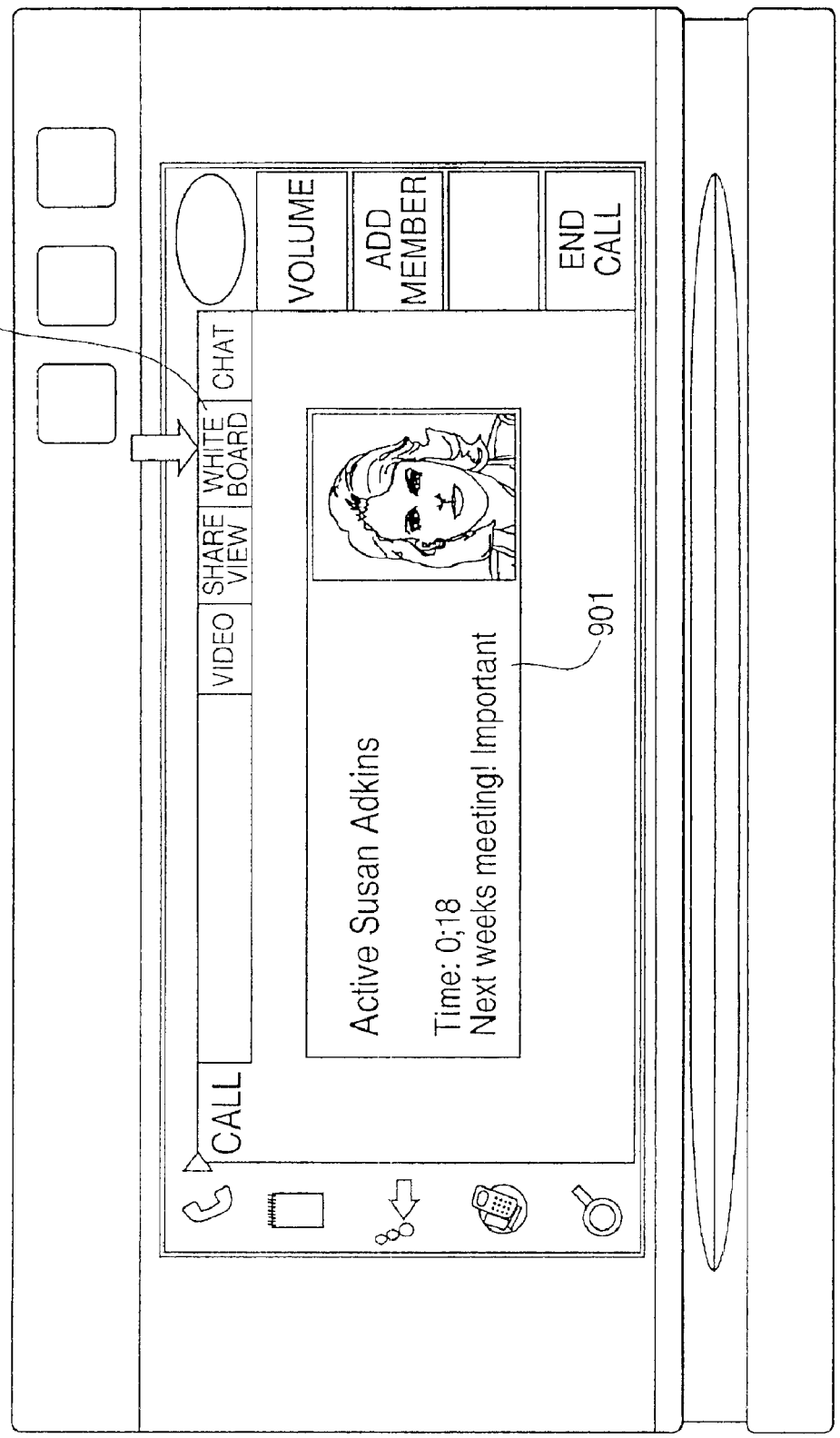
FIG. 9 is an illustration of the request for a second communication service made on the first mobile terminal during the communication service in FIG. 6.
Figure 10:
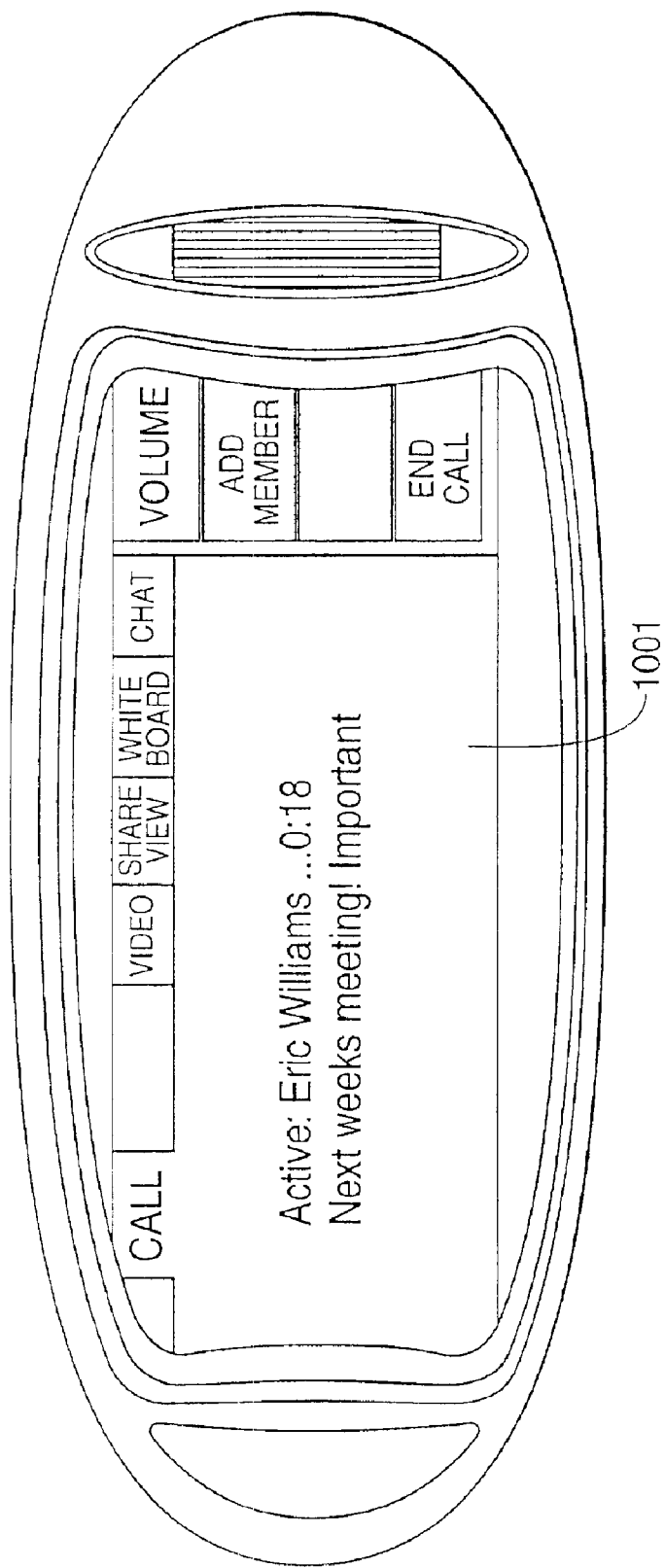
FIG. 10 is an illustration of the display on the second mobile terminal at the time the request for the second communication service is made.
Figure 11:
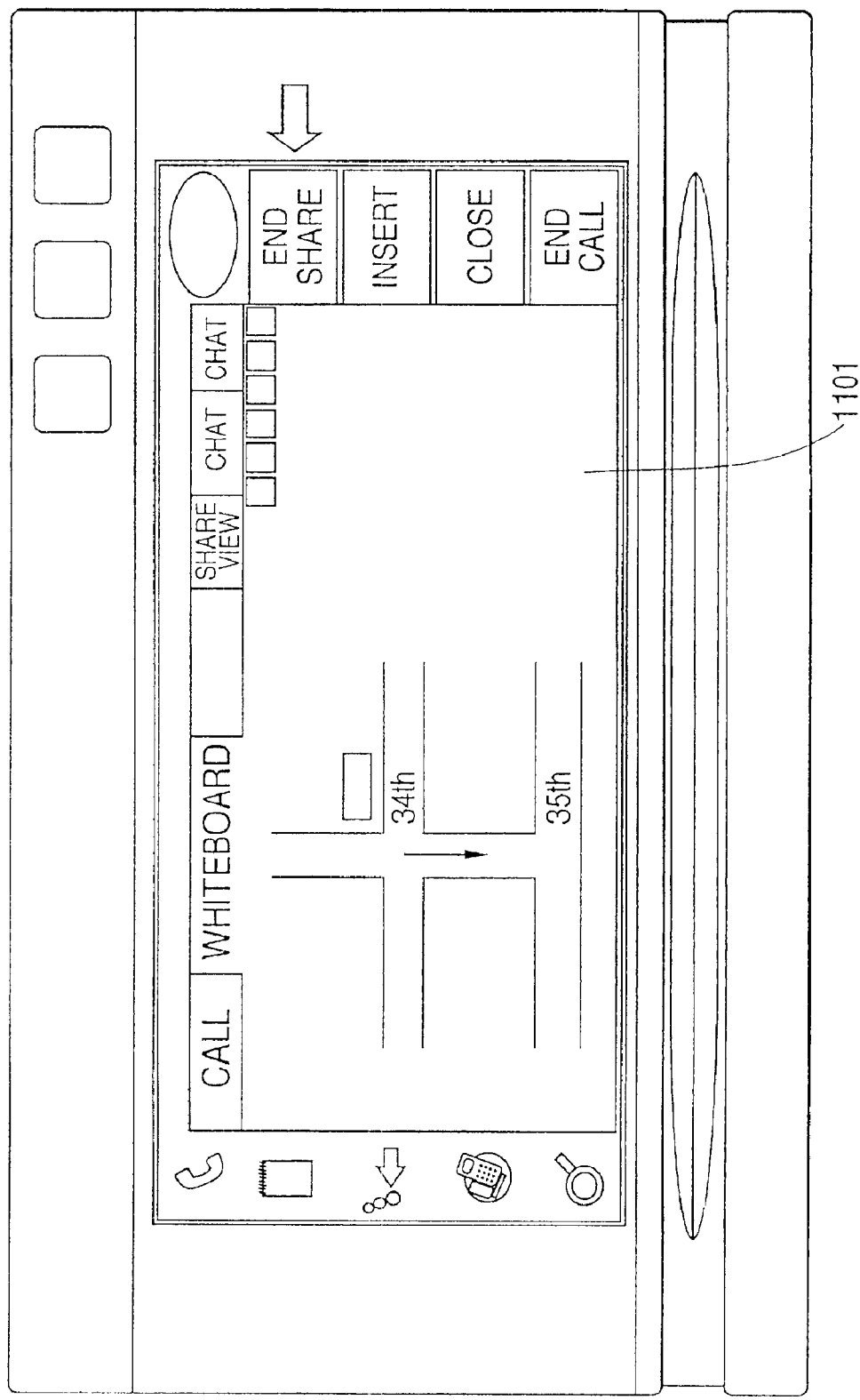
FIG. 11 is an illustration of the display on the first mobile terminal during the second communication service.
Figure 12:
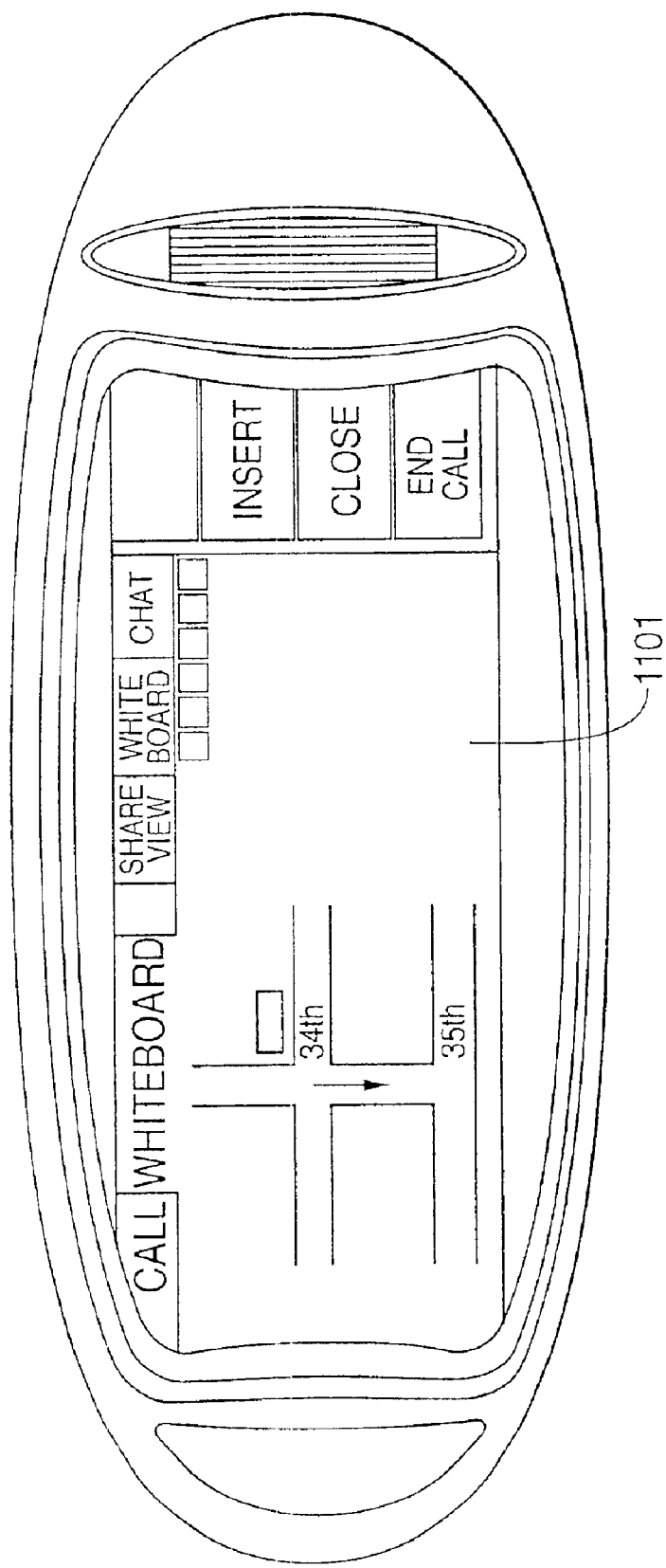
FIG. 12 is an illustration of the display on the second mobile terminal during the second communication service.
Figure 13:
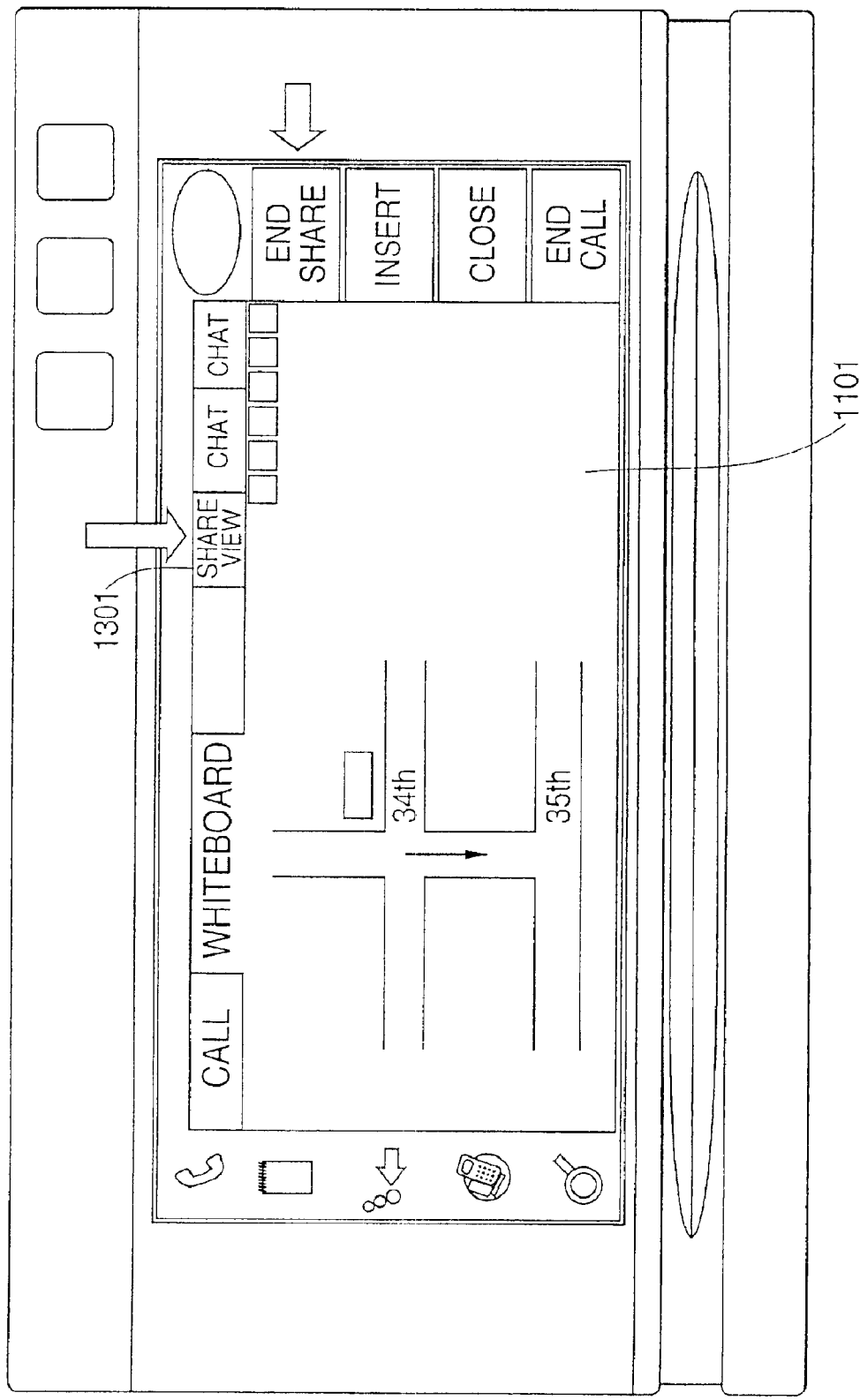
FIG. 13 is an illustration of the action taken at the first mobile terminal to end the second communication service and return to the first communication service.

As indicated by element 902 in FIG. 9, Eric may request a whiteboard service during the call by selecting tab 204. After making a drawing, such as the map shown in FIG. 11, Eric may request a share view (step 1102) communication service. Assuming that the request for a change to the share view communication service is accepted by Susan, the display on her terminal may become as shown in FIG. 12, including the map shown in window 1201. As indicated in FIG. 13, Eric may at the appropriate time activate the end share button 1302 to discontinue the shared view and return to the original call.

Some example implementations of steps 501–504 of FIG. 5 are provided above with respect to FIGS. 2–4 and to FIGS. 6–13. As indicated therein, the software application carrying out the method of switching communication services preferably sends the request and reply upon a simple input by the user and without any further actions necessary by the user. Any one of several available signaling methods (such as GPRS, SMS, etc.) may be employed in the network and in the terminals to transfer the initial request to change communication services from the first terminal to the second terminal and to transfer the reply from the second terminal to the first terminal if the invention is implemented software in the mobile terminals only and no extra support is required in the network (e.g., MGCF a).

As indicated at step 505 of FIG. 5, the method includes signaling to set up a change in communication resources of the services applying the information received originally from user command therefore at step 501 and possibly, information available in the network (e.g., MGCF a or any other entity) and an affirmative reply at step 504. As indicated at step 506 of FIG. 5, this signaling enables the switching of communication services on the displays of the terminals to appear to be substantially immediate. Exemplary, but non-limiting, implementations of steps 505 and 506 will now be discussed.

In a preferred embodiment, the request to change communication services is combined with a message or other information specific to the request and is synchronized with the request to be presented at substantially the same time that the prompt is provided to the receiving user. The presentation of this message or other information in a synchronized manner gives an impression of continuity to the receiving user.

The communication services may be established generally as described in published patent application W002052825, where there would be a circuit switched connection from the caller's terminal to the switch and the call leg from the switch to called party is a packet switched connection and the invention is implemented in the software of a mobile terminal. However, when a communication service is switched according to steps 501–504, the software application at Eric's terminal provides a SETUP message including instructions to, for example, MGCF 9 in FIG. 1. In MGCF 9, a SIP INVITE message is sent to Susan's mobile terminal. Feedback is signaled by sending a session progress message from Susan's mobile terminal to MGCF 9 to Eric's mobile terminal. Then, the physical call connection resources for the first communication service that are not required any more are released (disconnected) and the resources required for the second communication service are reserved. Next, alerting is signaled to Eric's mobile terminal and to Susan's mobile terminal. Preferably, the alert is not a ringing tone to be played, but instead some content (such as text or picture) drawn on the display of the mobile terminal. The presentation of this content is preferably synchronized with the availability of the second communication service in the manner described in pending U.S. patent application Ser. No. 10/026,912 filed on Dec. 27, 2001, and assigned to the same assignee (Nokia Corporation) as this application, the disclosure of which is hereby incorporated by reference into this application in its entirety. Preferably, the resources for the first communication service are disconnected only after a second CONNECT message is sent to the mobile terminals. Otherwise, during a very busy traffic hour, the connection from MGCF 9 to the mobile terminals may drop and the call connection may be released.

Figure 14A:
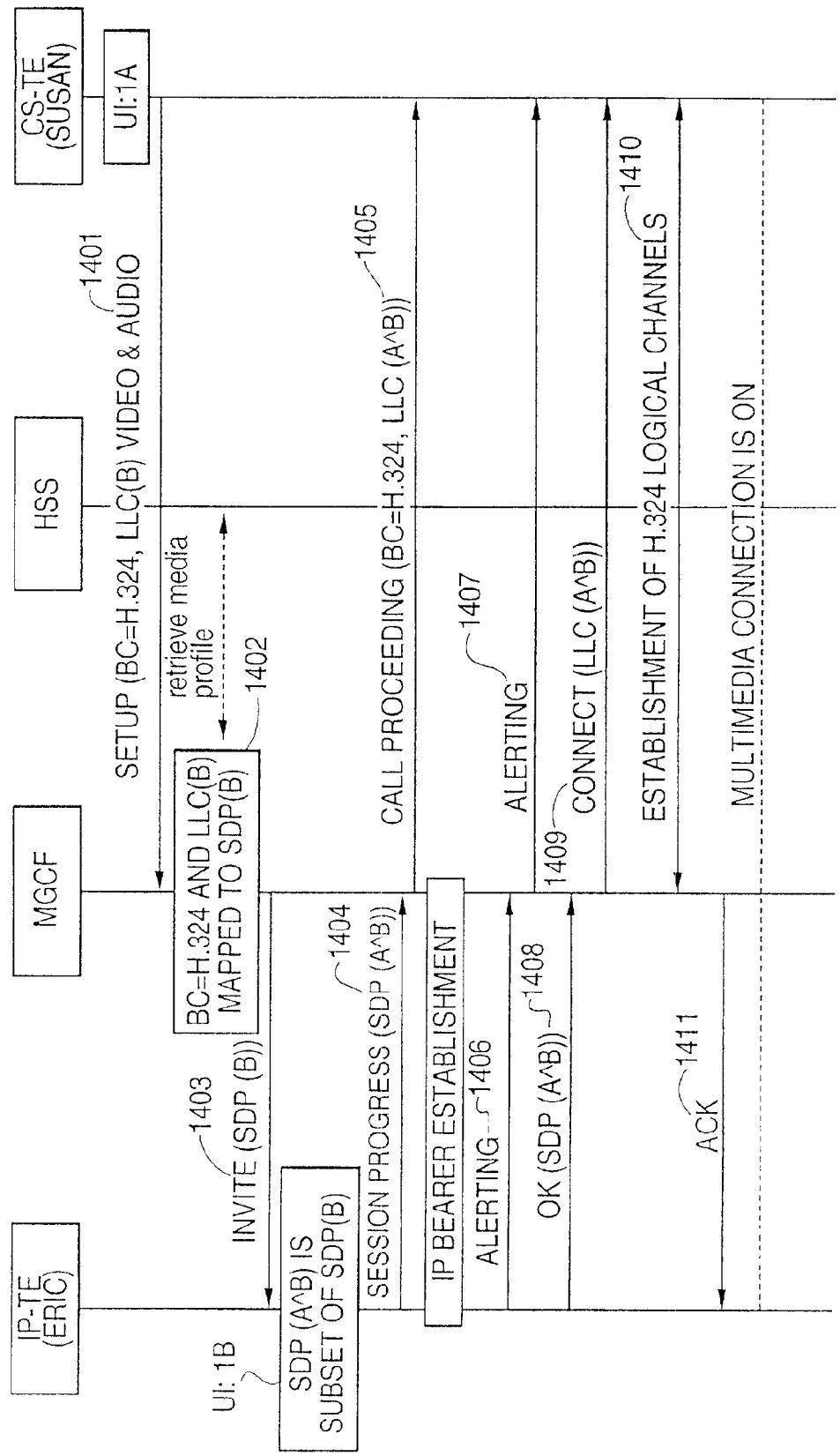
FIGS. 14A and 14B is illustrating a method of switching the communication services between two mobile terminals from a video call service to an audio call service to an audio call services between two mobile terminals.
Figure 14B:
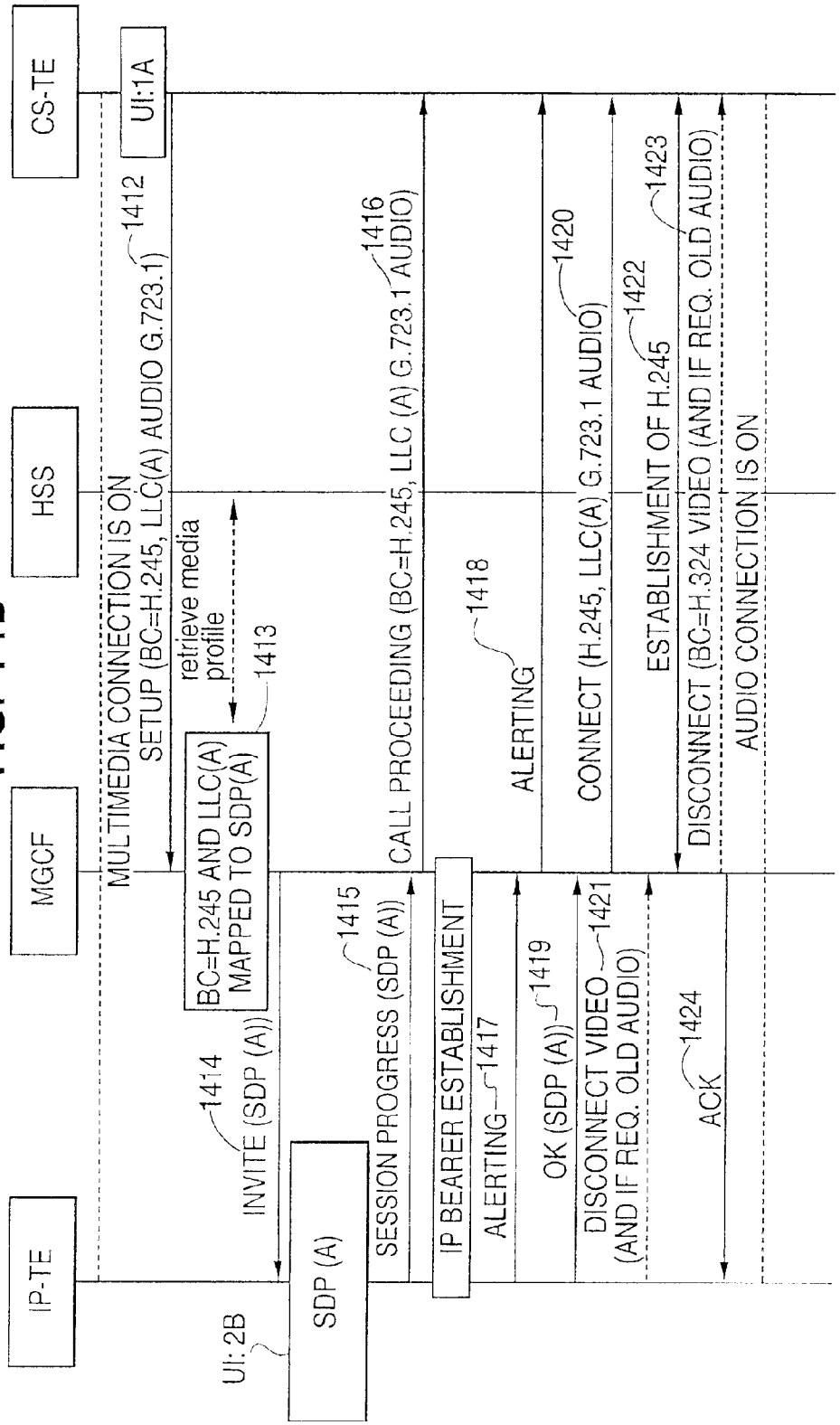
Figure 15A:
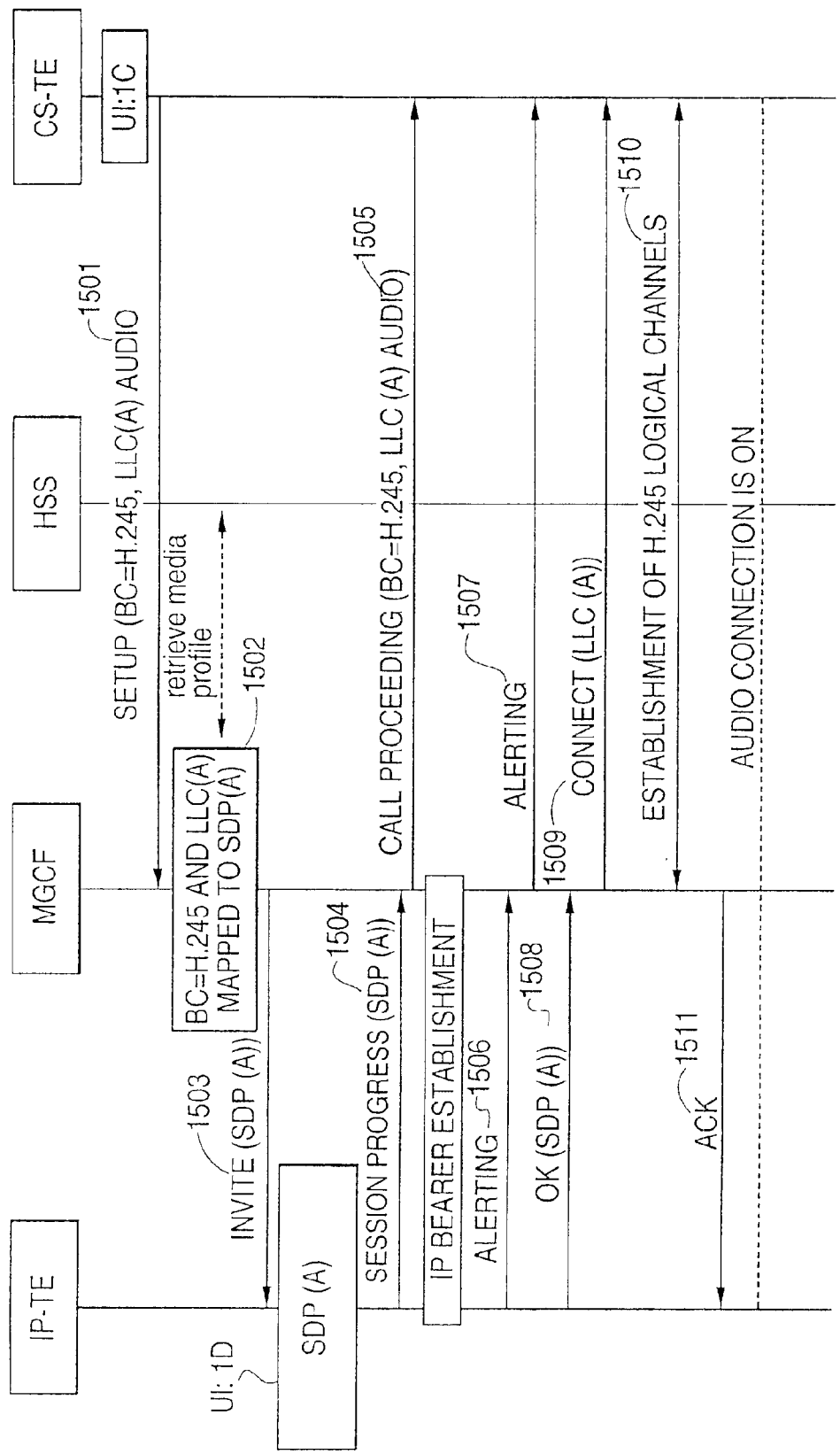
FIGS. 15A and 15B is illustrating a method of switching the communication services between two mobile terminals from an audio call service to a video call service.
Figure 15B:
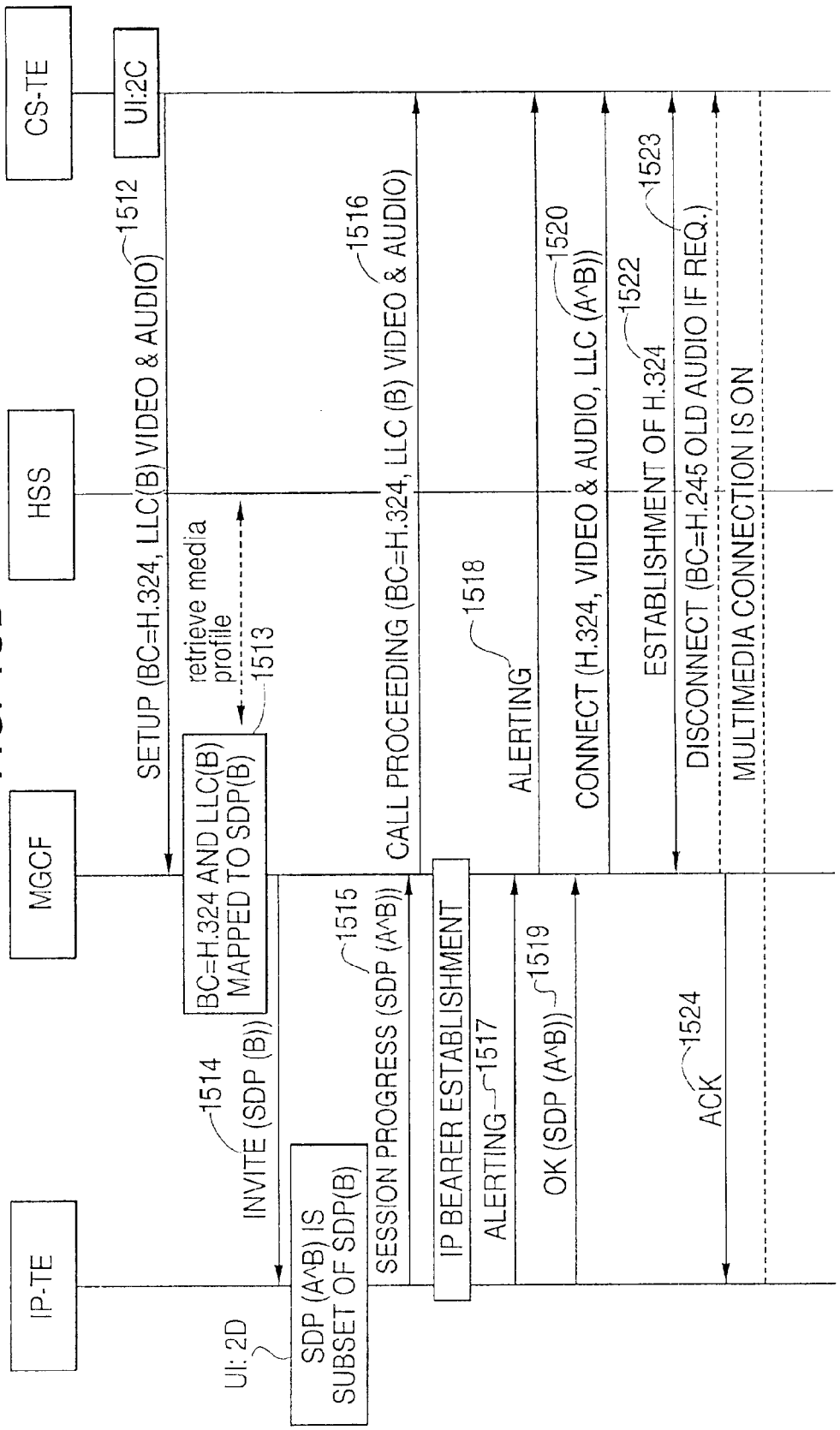

FIGS. 14–15 illustrate a method of switching the communication services from the video call service to audio call service or vise versa between two mobile terminals in the communication network system.

The method of switching communication services may require new software application in a network (e.g., MGCF a) to adapt the existing resources by releasing part of the used connection resources. Alternatively, (MGCF a) may reserve new resources and release earlier reserved resources. This is illustrated in detail in FIG. 14. The method starts with set up message sending (step 1401) from a first mobile terminal as result of its user wanting to establish a video call including audio a second mobile terminal. The MGCF 9 receives the originally sent set up message and it may retrieve the media profile of the calling mobile terminal (step 1402) that is applied for configuring the video call connection and is mapped from the Logical Link Control (LLC) Protocol from the Bearer Control Protocol H.324 to Session Description Protocol (SDP). The SDP is a session connection that may comprise one or more Radio Transfer Protocol (RTP) sessions and configured according to service requiring settings and consisting as many RTP sessions as required to satisfy the connection resource requirements. The MGCF a sends a SIP INVITE message to the called terminal (step 1403). The Session to be established, the second mobile terminal is signaled backwards to MGCF (step 1404) in a SESSION PROGRESS message and the MGCF a signals a CALL PROCEEDING message to the first mobile terminal (step 1405). When the first terminal has received the backward signaling from the second mobile terminal, it understands that the IP bearer is established from end to end between the first and second mobile terminals. The (first) (calling) mobile terminal is marked to include a user interface. UI 1A receives an alerting signaling (such as an audio indication) from the network (step 1407) that is originally signaled from the second mobile terminal (marked to include user interface, UI 1B) (step 1406). When the second mobile terminal (e.g., Eric) answers the initiated video call of the first mobile terminal owned by Susan, an OK SIP message is sent at step 1408 to MGCF and the network element MGCF sends CONNECT message of LLC to first mobile terminal (Susan). Now finally local channels from the first mobile terminal of Susan is established via MGCF 9 (step 1410) and MGCF 9 acknowledges the multimedia connection to be created to the second mobile terminal (the Eric's phone) by sending ACK SIP message (step 1411).

Now assume after a moment Susan wants to change from video call to audio for instance battery, because of power getting low or money being spent or for any other reason. She selects, from her user interface, a request to switch to an audio alternative. A setup message is sent from the first mobile terminal (step 1412), including audio e.g. G.723 request to the MGCF. Now the audio profile may be retrieved from Home Subscriber Server, (HSS) (step 1413) and used in configuring the mapping the Logical Link Control audio connection setup request to Service Description Protocol of an audio connection. The MGCF a sends a SIP INVITE message of audio IP bearer request (step 1414) to the second mobile terminal (Eric). The session going to be established to the second (called) mobile terminal is signaled backwards first to the network element MGCF (step 1415) in SESSION PROGRESS message and MGCF 9 signals CALL PROCEEDINGS message to the first mobile terminal (step 1416). When the first terminal has received the backward signaling from the second mobile terminal, it means that the audio IP bearer is established from end to end between mobile terminals first and second mobile terminals. The the first (calling) mobile terminal marked to include user interface, UI 1A receives alerting signaling audio indication from the network (step 1418) that is originally signaled from the second mobile terminal (marked to include user interface, UI 1B) (step 1417). When the called mobile terminal user (e.g., Eric) switches from the video call to the audio an OK SIP message is sent (step 1419) to MGCF 9 and the network element MGCF 9 sends CONNECT message of LLC to first mobile terminal (Susan) (step 1420). Now finally local channels from the first mobile terminal of Susan is established as H.245 type audio connection via network element MGCF 9 (step 1422) and MGCF 9 acknowledges an audio to be created to the second mobile terminal (the Eric's phone) by sending ACK SIP message (step 1424). The second mobile terminal may disconnect video connection (including the audio connection) immediately after having sent the SIP OK message of the audio connection (step 1419). Alternatively, an old audio part of the video connection is maintained concerning the RTP audio connections and only the moving picture part of the multimedia connection is disconnected (step 1421). The old video connection (including the audio as well) H.324 is disconnected (step 1423) between MGCF and first mobile terminal after the audio connection H.245 is established (step 1422). Alternatively, only the moving picture part of the bearer connection H.324 is disconnected in such a way that radio transfer protocol (RTP) connection used for audio is kept on and used for H.245. audio.

Another method of the invention is illustrated in FIG. 15. The MGCF 9 reserves new resources and release earlier reserved resources or the MGCF 9 reserves additional portion of the required network connection resources in respect to earlier used network connection in such a way that newly reserved and earlier provisional network connection resources are used together to satisfy the connection resource needs to support the newly switched service requirements. The method starts with set up message sending (step 1501) from first mobile terminal as result of its user wanting to establish an audio call to, the second mobile terminal. The MGCF 9 receives the originally sent set up message. The MGCF 9 may retrieve the medial profile of calling mobile terminal (step 1502) that is applied for configuring an audio call connection to be mapped from the Logical Link Control Protocol (LLC) and the Bearer Control Protocol H.245 to Session Description Protocol (SDP). The SDP is a session connection that may comprise one or more Radio Transfer Protocol (RTP) sessions and which are configured according to service required settings. The SDP connection consists as many RTP sessions as required to satisfy the connection resource requirements. The MSCF 9 sends an SIP INVITE message to be sent to the called terminal (step 1503). The Session going to be established to the (called) second mobile terminal is signaled backwards first to the network element MGCF (step 1504) in SESSION PROGRESS message and the MGCF signals CALL PROCEEDING message to the first mobile terminal (step 1505). When the first terminal has received the backward signaling from the second mobile terminal, it is understood that the IP bearer is established from end to end between mobile terminals first and second mobile terminals. The (calling) mobile terminal marked to include user interface, UI 1C receives alerting signaling audio indication form the network (step 1507) that is originally signaled from the second mobile terminal (marked to include user interface UI 1D) (step 1506). When the called mobile terminal user (e.g. Eric) answers the initiated audio call of the first mobile terminal owned by Susan, an OK SIP message is sent (step 1508) to MGCF 9 and the MGCF 9 sends CONNECT message of LLC to first mobile terminal (Susan). Now finally local channels from the first mobile terminal of Susan is established via MGCF 9 (step 1510) and MGCF 9 acknowledges the multimedia connection to be created to the second mobile terminal (the Eric's phone) by sending ACK SIP message (step 1511). Now assume that after a moment, Susan wants to change from audio call to video. She selects, from her user interface, a connection request to video alternative. A setup message is sent from the first mobile terminal including video (e.g. H.324) request to the MGCF 9. Now the audio profile may be retrieved from Home Subscriber Server (HSS) (step 1513) and it is used in configuring the mapping the Logical Link Control audio connection setup request to Description Protocol of an audio connection. The MGCF sends a SIP INVITE message of audio IP bearer request (step 1514) to the second mobile terminal (of Eric's). The Session going to be established to the second (called) mobile terminal is signaled backwards first to MGCF 9 at step 1515 in SESSION PROGRESS message and the MGCF 9 signals CALL PROCEEDING message to the first mobile terminal (step 1516). When the first terminals has received the backward signaling from the second mobile terminals, it means that the video IP bearer is established from end to end between the mobile terminals first and second mobile terminals. The first (calling) mobile terminal marked to include user interface UI 2C receives alerting signaling video indication from the network (step 1518) that is originally signaled from the second mobile terminal (marked to include user interface UI 2D) (step 1517). When the called mobile terminal user (e.g. Eric) switches from the audio call to the video, an OK SIP message is sent (step 1519) to MGCF 9 and the network element MGCF 9 sends CONNECT message of LLC to first mobile terminal (Susan) (step 1520). Now finally local channels from the first mobile terminal of Susan is established as H.324 type video connection via network element MGCF 9 (step 1522) and MGCF 9 acknowledges a video connection to be created to the second mobile terminal (Eric's phone) by sending ACK SIP message (step 1524). The second mobile terminal may disconnect the audio connection immediately after having sent the SIP OK message of the video connection (step 1519). Alternatively the audio connection is kept on concerning the RTP connections and only the moving picture part of the multimedia connection is connected (step 1520). However if the established video connection H.324 is connected with totally new radio transfer resources, then the old audio connection H.245 is disconnected (step 1523) between MGCF 9 and the first mobile terminal after the video connection H.324 is established While the invention has been described with reference to example embodiments, the description is illustrative and is not to be construed as limiting the invention. In particular, the various references to mobile terminals and Java refer merely to the terminology used in association with the preferred embodiments and is not meant to imply that the method according to the example embodiments must only be used with certain types of mobile terminals or implementing technologies.

What is claimed is:

1. A method of switching from a first communication service active between first and second mobile terminals to a second communication service in a wireless communication network, comprising:

in response to a command input by a user of the first mobile terminal through a user interface of said first mobile terminal, transferring a request from the first mobile terminal to the second mobile terminal, said request being a request to switch from said first communication service to said second communication service;

when received at the second mobile terminal, the request invoking a user interface on the second mobile terminal and prompting the user of the second mobile terminal to indicate whether or not they agree to switch from said first communication service to said second communication service;

sending a reply to said first terminal, said reply indicating whether or not the user of the second mobile terminal agreed to switch from said first communication service to said second communication service in response to said prompt; and initiating signaling to set up said second communication service in response to said reply; and terminating said first communication service to the first and second mobile terminal at substantially the same time that said second communication service is initiated at the first and second mobile terminal.

2. A method in accordance with claim 1, wherein said prompt indicates the type of said second communication service in the request.

3. A method in accordance with claim 2, wherein the first communication service is a voice call and the second communication service is a video call.

4. A method in accordance with claim 2, wherein the first communication service is a voice call and the second communication service is a chat session.

5. A method in accordance with claim 1, wherein the command is a software command.

6. A method in accordance with claim 5, wherein at least part of the method is performed by a software application on the first mobile terminal.

7. A method in accordance with claim 1, wherein said first and second communication services utilize primary connections in the wireless communication network.

8. A method in accordance with claim 7, wherein there are different billing parameters for the first communication service and the second communication service, and the billing parameters are switched at the same time that the communication services are switched.

9. A method in accordance with claim 8, wherein the different billing parameters include different billing rates and the billing rates are switched at the same time that the communication services are switched.

10. A method in accordance with claim 5, wherein at least part of the method is performed by a software application in a network element.

11. A method in accordance with claim 10, wherein said network element comprises a Media Gateway Control Function (MGCF).

12. A method in accordance with claim 11, wherein said first and second communication services utilize corresponding respective network connection resources, and said MGCF adapts the network connection resources corresponding to said first communication service for said second communication service by releasing part of the network connection resources corresponding to said first communication service.

13. A method in accordance with claim 11, wherein said first and second communication services utilize corresponding respective network connection resources, and said MGCF reserves new network connection resources for said second communication service and releases network connection resources reserved earlier for said first communication service.

14. A method in accordance with claim 11, wherein said first and second communication services utilize corresponding respective network connection resources, and said MGCF reserves network connection resources in addition to those required for said first communication service in such a way that the newly reserved network connection resources and earlier provisioned network connection resources for said first communication service are used together to satisfy the network connection resource requirements of the second communication service.

15. A method in accordance with claim 10, wherein information available from said network element is applied to set up changes in the network connection resources when switching from said first communication service to said second communication service.

* * * * *